United States Patent [19]

Willinger

[11] Patent Number: 4,842,726
[45] Date of Patent: * Jun. 27, 1989

[54] INSIDE FILTER FOR AQUARIUMS

[75] Inventor: Allan H. Willinger, Englewood, N.J.

[73] Assignee: Willinger Brothers, Inc., Oakland, N.J.

[*] Notice: The portion of the term of this patent subsequent to Jun. 28, 2005 has been disclaimed.

[21] Appl. No.: 118,478

[22] Filed: Nov. 9, 1987

Related U.S. Application Data

[62] Division of Ser. No. 808,094, Dec. 12, 1985, Pat. No. 4,753,723.

[51] Int. Cl.[4] .................... A01K 63/04; B01D 35/30
[52] U.S. Cl. .................................. 210/169; 210/238
[58] Field of Search .................... 210/169, 221.2, 232, 210/238, 416.2

[56] References Cited

U.S. PATENT DOCUMENTS

| | | | |
|---|---|---|---|
| 2,782,161 | 2/1957 | Willinger et al. | 210/169 |
| 3,477,580 | 11/1969 | Willinger | 210/169 |
| 3,630,367 | 12/1971 | Willinger | 210/169 |
| 3,720,317 | 3/1973 | Willinger | 210/169 |
| 3,785,494 | 1/1974 | Sama | 210/169 |
| 4,186,093 | 1/1980 | Willinger | 210/169 |
| 4,532,037 | 7/1985 | Willinger | 210/169 |
| 4,753,723 | 6/1988 | Willinger | 210/169 |

Primary Examiner—Richard V. Fisher
Assistant Examiner—Linda S. Evans
Attorney, Agent, or Firm—Halfgott & Karas

[57] ABSTRACT

A bottom aquarium filter for an aquarium tank including a substantially cylindrical container having an inwardly directed concave forward wall. A grill wall is removably coupled onto the concave forward wall and defines therewith an inlet chamber. A removable L-shaped insert member includes a substantially circular perforated platform wall and an upstanding convex partition wall. The platform wall spacedly sits on the bottom of the container and defines with the container a filtration chamber above the platform and a clear water chamber beneath the platform. The partition wall mates in opposition against a rear peripheral section of the circular wall of the container and defines therewith an air lift chamber. A removable cover mounts onto the container and includes a mouth aligned with the air lift chamber. The cover serves to retain all of the members in unitary assembly. An air tube fits into a spout projecting from the rear peripheral wall and extends into the air lift chamber terminating in an air diffuser which sits in a depressed compartment beneath the base wall of the container. The air tube can serve as a handle for lifting the filter assembly. The assembly can be easily separated for cleaning without the difficulty in reaching any portion of pre-formed compartments.

14 Claims, 3 Drawing Sheets

INSIDE FILTER FOR AQUARIUMS

This is a division of application Ser. No. 808,094, filed Dec. 12, 1985 now U.S. Pat. No. 4,753,723.

BACKGROUND OF THE INVENTION

This invention relates to aquarium filters, and more particularly to aquarium filters of the type which can be placed at the bottom of the aquarium for filtration and aeration of contaminated water contained in the aquarium.

A common type of aquarium filter is generally referred to as the bottom aquarium filter. Such type of filters are positioned at the bottom of the tank, normally above the gravel bed. Such typical filters are shown in U.S. Pat. Nos. 2,782,161; 3,477,580; 3,630,367 and 4,186,093. The filters described in these, as well as various other bottom aquarium filters, all have various chambers defined for specified purposes. Specifically, there is typically defined a receiving chamber for receiving the contaminated water from the aquarium filter and passing it through filtration material. The water is then collected in a clear water chamber which is in flow communication within an air lift tube. A supply of air is provided to the bottom of the air lift tube and as the air drifts upwardly in the air lift tube it draws the water from the clear water chamber into the air lift tube to pass upwardly along with the air and then back into the aquarium tank in an aerated and filtered condition. The construction of the various prior art filters included well defined individually constructed compartments, each of which respectively served as one of the aforementioned chambers. When assembled, these compartments were joined to form the aquarium filter. In order to clean the filter, the various compartments had to be separated and individually cleaned. The cleaning of individual compartments caused difficulty since narrow brushes were often required to fit into crevices and corners of the various compartments and thereby inadequate cleaning often occurred.

An additional problem with the aforementioned prior art filters was the difficulty in manipulating these filters. Once assembled, the filter must be lowered into the aquarium tank and suitably positioned.. In many cases, lowering the filter will cause it to be improperly situated in the tank and further manipulation of the filter assembly is required in order to properly position it at an appropriate location. Without externally available handles the aquarium owner's hands must be placed within the tank to reach the filter in order to properly position it. Similarly, insertion of the hands into the tank is required in order to extract the filter for cleaning. Such insertion of the hands often disturb the fish environment and may even contaminate the aquarium water causing damage to the various fish and plant life within the aquarium tank.

With most of the previous aquarium filters, the particular shape of the aquarium filter was rectangular so as to permit positioning of the aquarium filter in a corner of the aquarium tank. However, in doing so, narrow spaces were formed between the planar walls of the aquarium filter and the correspondingly planar walls of the filter tank. Such narrow spaces often provided insufficient room for the fish to swim therethrough and often fish could get caught and trapped between the walls of a square, rectangular or triangular shaped filter having flat sides with these sides confronting the aquarium tank walls.

Another construction problem with the prior art filters concerns the appropriate supply of air into the air lift chamber. Typically, a tube is inserted into the air lift chamber with an air diffuser or air stone, or the like, depending from the distal end of the tube. The air diffuser is usually placed at the lower portion of the air lift chamber and air supplied through the tubing is diffused through the air diffuser. Since the clear water chamber is usually adjacent or beneath the air lift chamber, the air passing from the air diffuser and flowing upwardly does not adequately pass by the clear water chamber itself and accordingly insufficient suction is provided by the air flow. Furthermore, the air flow does not have an opportunity to pass through the entire height of the air lift chamber since the air diffuser itself occupies a considerable portion of the height of the air lift chamber and air leaving from all parts of the air diffuser only has a portion of the height of the air lift chamber to travel through. Such short travel path provides insufficient aeration of the clear water passing back into the aquarium tank and also provides insufficient suction for adequate flow of water through the filter.

Accordingly, while the prior art bottom aquarium filters have been utilized quite successfully, further improvement is warranted in order to alleviate the aforementioned problems.

SUMMARY OF THE INVENTION

Accordingly, it is an object of the present invention to provide an aquarium filter which avoids the aforementioned problems of prior art devices.

Another object of the present invention is to provide a bottom aquarium filter in which the individual filter chambers are compositely formed of separating walls so as to permit easy cleaning of all parts of the aquarium filter.

Yet another object of the present invention is to provide a bottom aquarium filter having an assembly of parts which are compositely held together in an assembled condition by means of a tightly fitting cover.

Another object of the present invention is to provide a bottom aquarium filter having an air tube with a depending air diffuser which extends into the air lift chamber, and for retaining the air diffuser secured in the chamber so that the air lift tube can serve as a handle for insertion, removal, or manipulation of the aquarium filter.

Yet another object of the present invention is to provide a bottom aquarium filter which is substantially cylindrical in shape, in order to avoid the trapping of fish between the walls of the filter and the aquarium tank.

Still a further object of the present invention is to provide a bottom aquarium filter where the air diffuser is retained, at the base of the air lift chamber so as to provide maximum lift of the water, thereby adding to the force of the flow of water through the filter and improve the aeration of the water returning to the aquarium. A further object of the present invention is to provide a bottom aquarium filter having an elliptically shaped receiving chamber and air lift chamber, permitting a greater filtration compartment for filtering of the contaminated water.

Another object of the present invention is to provide a bottom aquarium filter having an integrally formed pedestal portion for positioning beneath the gravel of the aquarium tank, whereby the pedestal portion cannot fall off as the filter is lifted or manipulated.

Yet another object of the present invention is to provide a bottom filter having a receiving chamber and an air lift chamber respectively defined by the composite mating of opposing wall members, and including a cover which tightly presses the wall members together so as to avoid leakage from the various compositely formed chambers.

Briefly, in accordance with the present invention, there is provided an aquarium filter for positioning at the bottom of an aquarium tank. The filter includes a container with a forward wall. A grill wall is removably coupled in opposition to the forward wall to define therewith the inlet receiving chamber for receiving contaminated water from the aquarium tank. An inside member is provided which includes a perforated platform wall integrally connected with an upstanding partition wall. The platform wall is spacedly seated onto the bottom of the container and defines with the bottom of the container a clear water chamber. The portion of the container above the platform defines a filtration chamber. The partition wall mates in opposition against a rear section of the container wall and defines therewith an airlift chamber. A removable cover is mounted onto the container and includes a mouth which is aligned with the air lift chamber. The cover locks onto the container and retains the various sections thereof in a tight assembled condition.

Contaminated water from the inlet chamber can flow over the forward wall of the container and into the filtration chamber. The water is then decontaminated through filter material retained within the filtration chamber and then passes through the perforated platform to the clear water chamber. The water can then egress through the air lift chamber and out of the mouth provided in the cover. In an embodiment of the invention the filter container is substantially cylindrical in shape with the forward wall being inwardly directed and concavely shaped. The grill wall is removable and has a slight convex shape defining with the forward wall an elliptically shaped receiving chamber. The inside member is L-shaped and removable with its platform being circular. The partition wall is convex to define with the rear peripheral circular wall of the container an elliptically shaped air lift chamber.

In an embodiment of the invention, a spout is provided in the rear wall of the cylindrical compartment in flow communication with the air lift chamber. A tubing passes downward through the spout and into the air lift chamber with an air diffuser depending from the distal end of the tubing. A shoulder member extending into the air lift chamber maintains the air diffuser positioned at the base of the air lift chamber. In this manner, the air diffuser is securely retained in place with the cover mounted on the container and the tubing can be used as a handle for securely lifting, manipulating, and inserting the aquarium filter appropriately in the aquarium tank.

In an embodiment of the invention, a depressed compartment is formed in the base wall of the container and a raised instep is formed between the junction of the platform and the upstanding wall partition. The depressed compartment in conjunction with the mating raised instep defines a receiving compartment for the air diffuser and positions the air diffuser at a level so that at least a portion of it is beneath the clear water chamber. In this manner, the air supplied through the air diffuser has a greater flow path providing increased lift for the water, greater suction, and improved aeration of the water returning to the aquarium tank.

The shape of the air diffuser receiving compartment can be formed with a sloped forward end in order to direct the air from the air diffuser into the air lift chamber to thereby further improve the suction and flow of the water through the filter.

A retaining member can depend from the cover to retain the filtration material and maintain a spaced flow chamber between it and the cover. The arrangement permits flow of contaminated water from the receiving chamber to the filtration chamber.

The aforementioned objects, features and advantages of the invention will, in part, be pointed out with particularity and will, in part, become obvious from the following more detailed description of the invention, taken in conjunction with the accompanying drawings, which form an integral part thereof.

BRIEF DESCRIPTION OF THE DRAWING

In the drawing.

In the various figures of the drawing, like reference characters designate like parts.

DESCRIPTION OF THE PREFERRED EMBODIMENT

Figure 1:
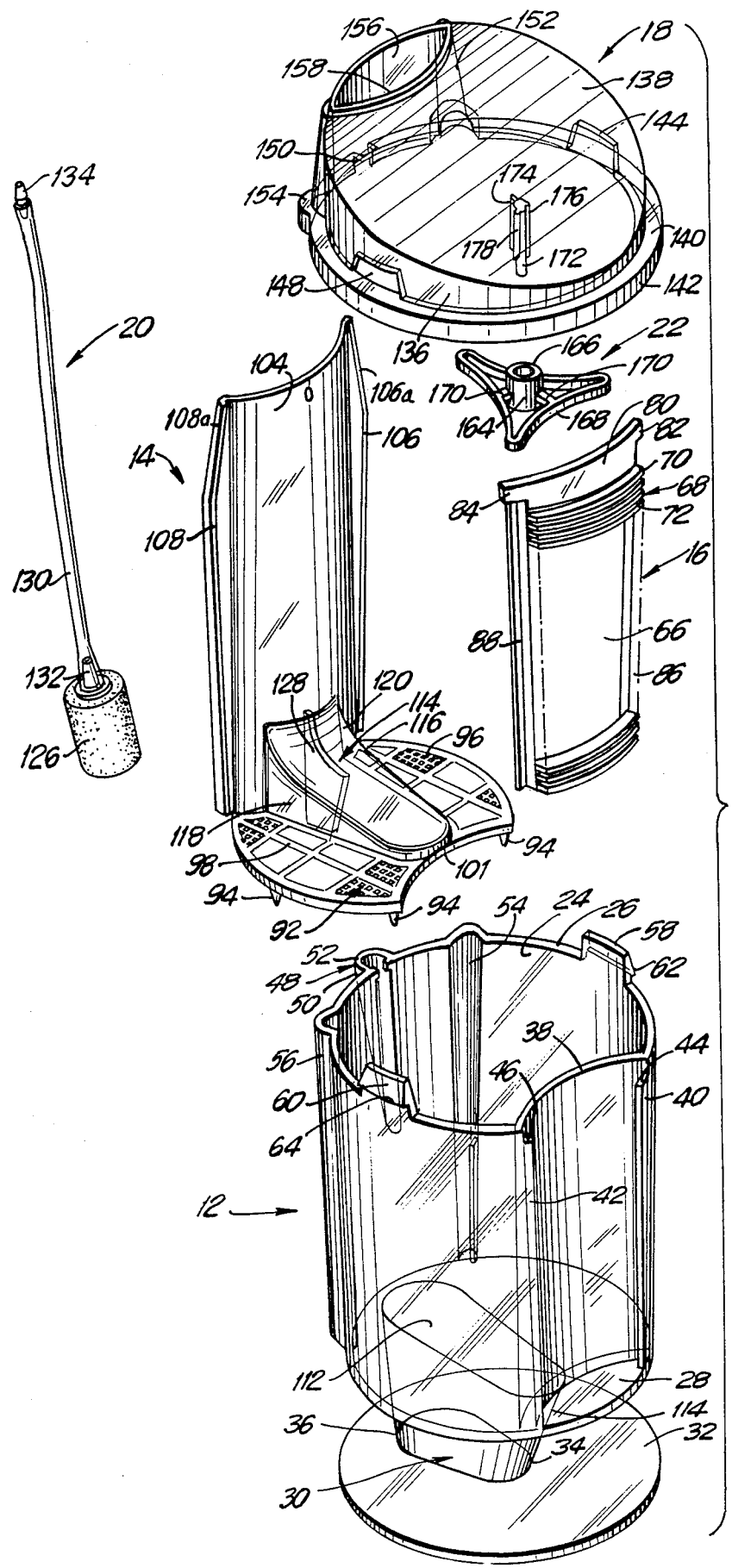
FIG. 1 is a perspective exploded view of the various parts of the filter assembly in accordance with the present invention.

Referring now to the drawings, the bottom aquarium filter shown generally at 10 includes a substantially cylindrical housing container 12, an L-shaped removable insert member 14, a forward grill wall 16, a cover member 18, an air lift tubing member 20, and a retaining member 22

The container 12 includes a substantially cylindrical peripheral outer wall 24, terminating in a substantially flat upper edge 26. A lower base wall 28 closes off the bottom of the container and interconnects with a narrow neck portion 30 coupling to a flat pedestal 32. The neck portion includes tapered forward and rear walls 34, 36 with the forward wall 34 being substantially steeper than the rear wall 36. The upper end of the container 12 is open.

Figure 5:
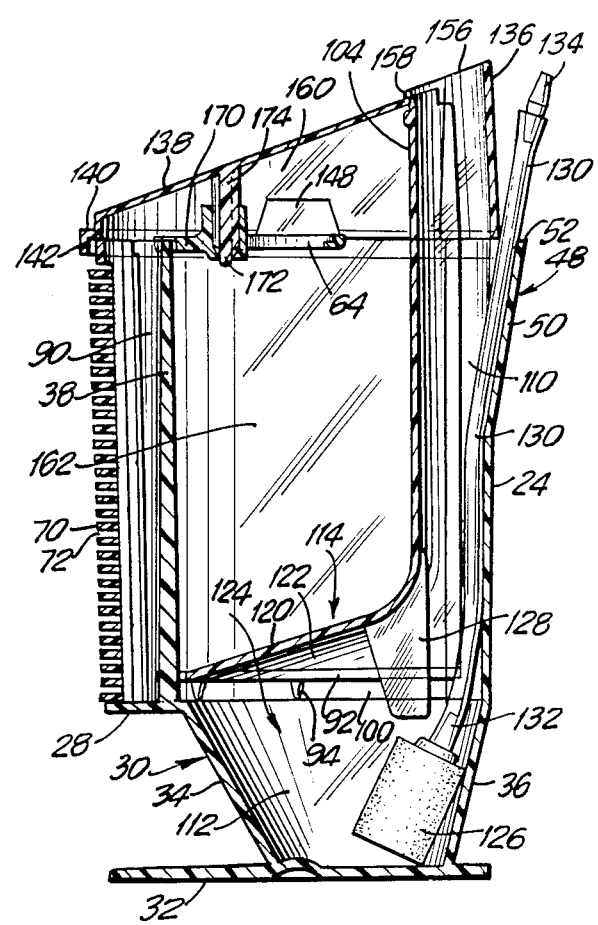
FIG. 5 is a cross sectional view taken along lines 5—5 of FIG. 4.

At the forward portion of the cylindrical container, the cylindrical outer wall is spaced apart by a gap which is closed off by an inwardly oriented concave wall 38. The peripheral outer wall extends partially into the gap on either side of the concave wall 38 to form the side edge walls 40, 42. As best seen in FIGS. 1 and 5, wall 38 is upwardly tapered so as to provide a wider mouth at the top. A notched shoulder 44, 46 is provided at the upper edge of the walls 40, 42.

An outwardly projecting spout 48 is formed at the upper edge of the rear portion of the peripheral outer wall 24. The spout includes a rearwardly directed part 50 angularly directed from the rear portion of the peripheral wall and terminating in the upper edge 52 defining a mouth portion.

An opposing pair of outwardly projecting, upwardly flared receiving channels 54, 56 are positioned on either side of the spout 48. Upwardly projecting tabs 58, 60 are opposingly positioned on lateral sides of the cylindrical container 12 orthogonally positioned with respect to the spout and forward wall axis. The locking tabs 58, 60 have respective outwardly extending lips 62, 64. The tabs 58, 60 engage into sockets in the cover member 18, as will hereinafter be described. Thumb grip portions could be formed into the outer periphery of the container walls beneath the locking tabs 58, 60 so as to provide finger grips for compression of the opposing cylindrical side walls to release the locking tabs from the sockets in the cover member.

Figure 3:
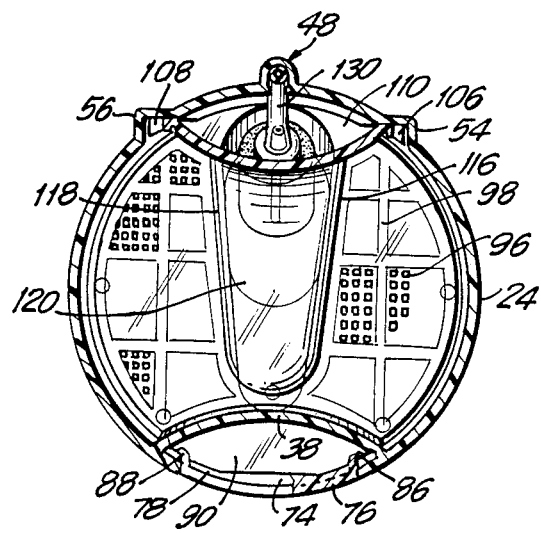
FIG. 3 is a cross sectional view taken along lines 3—3 of FIG. 2.
Figure 4:
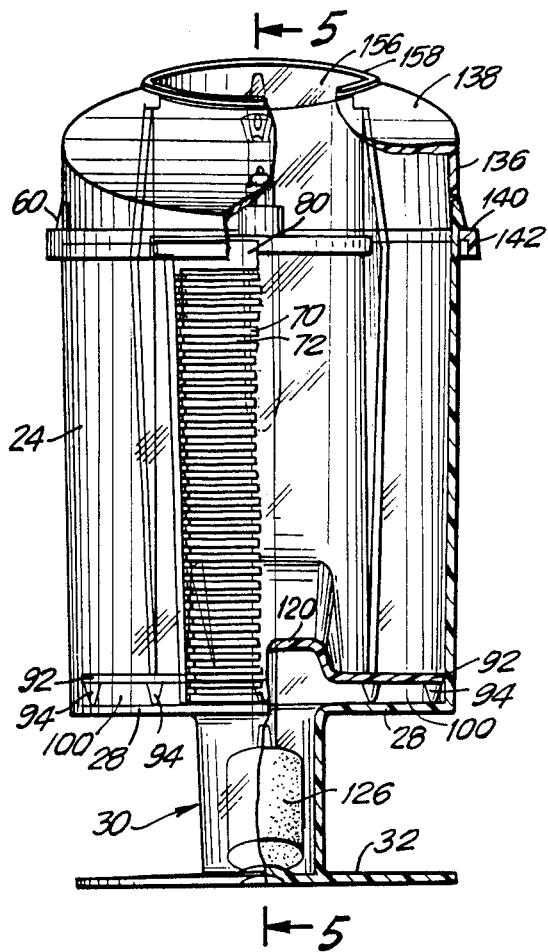
FIG. 4 is a front elevational view, partially in section, of the aquarium filter in accordance with the present invention.

The grill member 16 includes a convex outer wall 66 having a grill 68 formed therein, the grill 68 is formed of a plurality of slats 70 separated by spaces 72. The slats 70 have a wider center 74 and thinner lateral positions, 76, 78 as best seen in FIG. 3. The spacing between the slats 70 is designed to permit the passage of contaminated water from the aquarium tank through the grill while preventing passage of fish through the grill. The grill substantially forms the entire height of the wall 66. At the upper edge is a border strip 80 for fitting beneath the cover member to retain the grill in place, as will hereinafter be described. The border strip 80 includes lateral retaining arms 82, 84 which rest on the shoulders 44, 46 of the side edge walls 40, 42.

Laterally projecting on either side of the convex wall 66, are a pair of retaining wall sections 86, 88 which define shoulders for fitting behind the side edge retaining walls 40, 42 extending in front of the forward wall 38. With the grill member 16 in place, as shown in FIG. 3, the grill member 16 defines with the concave forward wall 38 on oval shaped chamber 90 serving as the inlet chamber for receiving contaminated water from the aquarium tank. The height of the grill member 16 substantially corresponds to the height of the forward concave wall 38. The lower end of the grill member 16 fits on a forward projecting ledge of the base wall 28 so as to define a substantially closed bottom.

The L-shaped member 14 comprises a substantially flat circular perforated platform wall 92 with downwardly projecting feet 94. The perforations 96 are grouped sectors which are separated by solid path strips 98 for support. A forward cutout portion 101 formed on the platform 92 accommodates the inwardly projecting curved forward wall 38. The platform 92 includes perforations 96 which are sized so as to permit flow through of the water without passage therethrough of filtration material retained thereabove.

The platform 92 fits onto the base wall 28 of the container and is spaced thereabove by means of the feet 94 so as to define between the platform and the base wall 28 a clear water chamber 100. Above the platform 92, there is defined a filtration chamber in which appropriate filtration material is placed. The filtration material is such that it remains within the container and cannot pass through the perforations.

Upwardly extending from the rear of the platform 92 is a convex partition wall 104 having a pair of forwardly projecting, upwardly flared side walls 106, 108. The upper ends of the side walls are rearwardly tapered as shown at 106a and 108a. With the platform 92 sitting above the base wall 28, the side walls 106, 108 fit into the channels 54, 56 and are securely retained therein. The space between the rearward portion of the peripheral wall of the container and the partition wall 104 defines an oval air lift chamber 110. As best seen in FIG. 5, the partition wall 104 substantially extends above the height of the container wall 24.

As best seen in FIG. 1, a depressed compartment 112 is formed beneath the base wall 28 and extends into the neck portion 30. Mating with the compartment 112 there is provided a projecting instep portion 114 between the platform wall 92 and the partition wall 104 of the L-shaped insert member 14. The instep 114 includes a pair of opposing substantially triangular side walls 116, 118, and a sloping forward wall 120. As best seen in FIG. 5, the instep compartment 122 mates with the depressed compartment 112 to define a chamber 124 for receiving an air diffuser 126 therein. With the air diffuser positioned within the chamber, at least a substantial portion of the air diffuser 126 will be beneath the platform wall 92, for a purpose to be hereinafter described. A downwardly projecting shoulder member 128 formed internally of the instep portion serves as a locking member to retain the air diffuser 126 in place.

The air diffuser 126 is connected at the distal end of a tubing 130 as part of the air tube member 20. A coupling nozzle 132 on the air diffuser couples to one end of the tube, and a coupling 134 can be provided at the other end of the tube 130 for connection to an air supply, such as a pump.

As best seen in FIG. 5, the tubing 130 fits through the spout 48 by entering the mouth 52 of the spout 48 and passing along the rear wall 50 thereof so as to enter into the air lift chamber 110 defined between the partition wall 104 and the rear of the peripheral wall 24 of the container. The air tubing 130 extends downward to the base of the air lift chamber 110 until the air diffuser 126 is captured beneath the shoulder member 128 and restrained in place.

The cover member 18 includes a substantially cylindrical outer wall 136 with a top wall 138 downwardly sloping toward the front direction. An outwardly extending radial flange 140 surrounds the bottom periphery of the outer wall 136 and terminates in a downwardly depending skirt portion 142. A pair of opposing socket openings 144, 148 are provided for receiving the locking tabs 58, 60.

At the rear of the peripheral edge of the cover there is provided an inwardly directed notch 150 for mating with the mouth 52 of the spout 48 so as to provide a composite opening for receiving the air tubing 130. A pair of outwardly projecting channels 152, 154, which are upwardly narrowing mate with the channels 54, 56 in container 12 and receive the rearwardly tapered ends of the side walls 106, 108 of L-shaped member 14.

At the upper rear edge of the cover member is an oval shaped mouth 156 having an upwardly extending peripheral lip portion 158. The shape of the mouth 156 is aligned with the oval shaped opening of the air lift chamber 110 defined between the partition wall 104 and the rear of peripheral outer wall 24 of the container 12.

Figure 2:
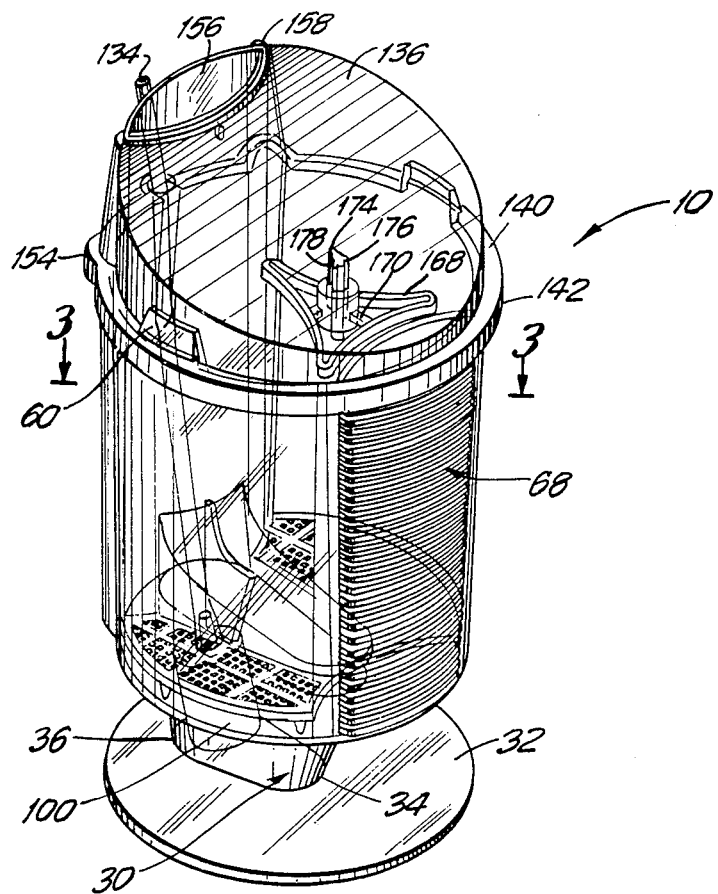
FIG. 2 is a perspective view of the assembled aquarium filter in accordance with the present invention.

The cover member 18 when placed in position, serves to lock together the various assembled parts of the filter, as best seen in FIGS. 2 and 5. Specifically, the forward skirt portion 142 fits around the grill portion and overlies its upper ledge 80 to retain the grill locked in place. The forward lip 158 of the mouth 156 serves as a shoulder abutting against the upper distal edge of the partition wall 104.

Accordingly, with the cover 18 secured on to the container, all of the assembled parts are locked in place and a unitary filter assembly is provided. Furthermore, with the air tube initially positioned in place prior to the closing of the cover member, the air tube likewise gets locked in place by means of the shoulder member 128 holding the air diffuser down. In this way, the air tube 130 can be used as a handle for lifting up and removing the filter assembly, or for inserting it or manipulating it in the aquarium tank. All of the parts will be held securely together even though the filter is lifted up by the air tube.

It should further be appreciated that in order to clean the assembly, all that is necessary is to remove the cover and disassemble the various members. Once disassembled, the various wall sections defining the inlet chamber, the clear water chamber, and the air lift chamber, are separated. These chambers not being actually formed as compartments disassemble into individual wall sections which can be easily cleaned as separate walls.

In the prior art filters, closed containers were provided for the various chambers. Brushes were therefore required to clean the narrow crevices of the closed container, making it difficult to clean all the crevices. In the absence of such closed compartments in the present filter assembly, it is easy to clean the separate walls without the necessity of inserting narrow brushes, and thereby the filter can be adequately cleaned of all contaminating material.

In operation, the filter is assembled and proper filtration material placed in the filtration compartment above the platform 92. With the filter placed at the bottom of the aquarium, gravel can be situated above the pedestal wall 32 so as to hold the filter securely in place. It should be noted, that the pedestal wall is integral with the container so that when lifting the filter the pedestal will not fall off.

Contaminated water can flow through the grill into the inlet compartment 90. The water can then flow over the top of the forward wall 38 since the sloping cover is spaced above the forward wall 36. The water will flow into the filtration compartment above the platform 92 where the water will be filtered by the filtration material.

In order to keep the filtration material spaced from the cover 18 and provide a flow chamber 160 for the contaminated water from the inlet compartment 90 to the filtration compartment 162, a retainer member 22 is utilized. The retainer member 22 comprises a center hub 164 held by support struts 170 attached to a retainer wall 168. A prong 172 depends from the top wall 138 for entry into the hold 166. Laterally projecting ribs 174, 176, 178 are received in correspondingly provided slots in hole 166. By making the ribs varying in size, e.g. rib 174 larger then the others, and the receiving slots correspondingly sized, a keyed arrangement can be provided to mate the retainer member 22 onto the prong 172.

The water which passes through the flow chamber 160 beneath the cover top wall 138 flows through the filtration material in the filtration compartment 162. The now filtered water can pass downward through the perforations 96 in the platform wall 92 and flow into the clear water chamber 100. As air is sent into the air lift chamber 110 through the air diffuser 126, the air will flow into the receiving compartment defined by the depressed portion beneath the clear water chamber. The air will therefore flow upwardly into the air lift chamber. As the air flows upwardly, it causes a suction whereby the clear water will be pulled from the clear water chamber 100 into the air lift chamber 110 and be drawn upwardly along with the air. This clear water will be aerated as it flows upwards through the air lift chamber. The water will then flow out of the mouth 156 in the cover and back into the aquarium tank.

It should be appreciated that with the present construction there is provided an aquarium filter which does not have separate pre-formed chambers. As a result, the air lift chamber is actually a composite formed of separate walls which are merged adjacent to each other to define the chamber.

Because of the lack of a separate pre-formed air lift chamber, when the filtration material is inserted into the filtration compartment, it is not necessary to wrap the filtration material around any areas blocked by tubes, compartments, or separate closed off areas. Similarly, since there are no closed pre-formed compartments, cleaning is easily achieved simply by opening the cover and dumping out the filtering materials. All parts are exposed and can be easily removed for cleaning.

The entire filter can be lifted by means of grasping the air line tubing. All parts are locked in place and lifting of the tubing will not cause disassembly of the filter. The platform is locked in place by the cover pressing down on the partition wall 104. The platform 92 in turn locks the air diffuser in place and thereby retains the air tubing permitting its use as a handle.

The platform 92 can be made with a very small perforation whereby fine grain carbon can be utilized as the filtration material which is much more efficient than courser carbons which are normally used.

The front grill being removable permits interchangeability of the size of the grill. In this manner, the size of the grill can be adjusted to accommodate the various fish sizes in the aquarium tank. A baby saver grill can be provided for the use of the aquarium filter with tiny fish.

The air diffuser itself sits below the platform level providing maximum lift height for the air to flow without the need of additional extensions. This adds additional force to the flow of the air, upwardly increasing the suction and permitting a greater flow through of the filtered water. The air diffuser furthermore does not block or narrow the air lift passageway as in prior art filters, and thereby permits a greater flow of water upwardly through the air lift chamber.

The air line tube itself comes out of the filter at approximately cover level as opposed to the prior art where it comes out of the top of the filter.

The inlet chamber and the air lift chamber are compositely assembled, elliptically shaped compartments. Furthermore, the cylindrical shape of the filter itself avoids planar surfaces, which occur in prior art square and triangular filters. Accordingly, fish cannot get trapped between the walls of the filter and the aquarium tank walls.

Although the filter has been described as being circular, it should be appreciated that other shapes could be formed for the filter, such as elliptical, triangular, and others, and still obtain many of the unique benefits of this invention.

The pedestal portion being integral with the container prevents the falling off of the pedestal as the filter is pulled upwardly by means of the air tube. The shape of the receiving chamber for the air diffuser includes a forwardly sloped front end similar to the shape of an arrowhead. This permits directing the air from the air diffuser toward the clear water chamber so as to provide greater suction of the clear water into the air lift chamber. Also, it prevents obstruction of the flow of air.

There has been described heretofore the best embodiment of the invention presently contemplated. However, it is to be understood that various changes and modifications may be made thereto without departing from the spirit of the invention.

I claim:

1. An aquarium filter for an aquarium tank, said filter formed of separable walls which independently do not form closed operational filter chambers and only in the assembled condition form such chambers, said filter comprising in combination:

a container having a forward wall, a separate removable grill wall member coupled in opposition to said forward wall to define therewith an inlet chamber for receiving contaminated water from the aquarium, a separate removable insert member having a perforated platform wall and an upstanding partition wall, said platform wall spacedly seated on the bottom of said container and defining with said container a filtration chamber above said platform wall and a clear water chamber beneath said platform wall, said partition wall mating in opposition to a rear peripheral wall of said container and defining therewith a return tube air lift chamber on one side thereof with said filtration chamber being on the other side thereof, means on the sides of said partition wall mating with opposing means on said rear peripheral wall to hold the partition wall against the rear peripheral wall, and a removable cover member for mounting onto said container and including a mouth aligned with said air lift chamber, whereby contaminated water from said inlet chamber can flow over said forward wall and into said filtration chamber where said contaminated water is substantially decontaminated before passing through said perforated platform to said clear water chamber for egress through said air lift chamber back into the aquarium.

2. An aquarium filter as in claim 1, and comprising locking means for locking said cover member onto said container, and retention means associated with said cover member for locking in place said insert member and a grill wall member, whereby said cover member serves to retain the filter in secured assembled condition, whereby the inlet chamber, the filtration chamber, the clear water chamber and the return tube air lift chamber are individually defined and leakage between the chambers is avoided.

3. An aquarium filter as in claim 2, and further comprising a spout projecting from an upper edge of the rear peripheral container wall and defining a passageway in flow communication with the air lift chamber, and an air tube received in said passageway for supplying air into the air lift chamber to draw the water through the filter.

4. An aquarium filter as in claim 3, and further comprising shoulder means depending from said partition wall for restraining an air diffuser connected to the distal end of said air tube, whereby said air tube is prevented from sliding up the air lift chamber and can serve as a handle for manipulation of the filter in the aquarium.

5. An aquarium filter as in claim 2, wherein said partition wall comprises a pair of forwardly directed lateral edges, and wherein the rear peripheral wall of said container comprises a pair of vertical channels outwardly projecting from the rear peripheral wall of the container for securely receiving said lateral edges whereby said partition wall can form a secure enclosure with the rear peripheral wall.

6. An aquarium filter as in claim 2, and comprising an outwardly directed radial flange formed about the lower peripheral edge of the cover member for sitting onto an upper edge of said container, and a skirt portion depending from said flange for overhanging the container and locking over said grill wall member.

7. An aquarium filter as in claim 2, and comprising a retention member depending from said cover member for spacedly retaining a filtration material from the top of the cover member to define a flow chamber between the inlet chamber and the filtration chamber through which the contaminated water can flow.

8. An aquarium filter as in claim 1, and further comprising a pair of opposing wall sections extending from the peripheral wall of said container partially in front of said forward wall, and wherein said grill member comprises a pair of laterally extending retaining wall sections along its vertical height for gripping rearward of said extending wall sections.

9. An aquarium filter as in claim 1, wherein said container is substantially cylindrical in shape, said forward wall is concave and inwardly directed from the cylindrical container, said insert member is L-shaped with said perforated platform wall being substantially circular and said upstanding partition wall being convex.

10. An aquarium filter assembly for an aquarium tank, said assembly having no pre-formed chambers in a disassembled condition and being formed of separable walls which are assembled to form the filter assembly, said filter assembly comprising a container, a first removable partition wall confrontingly engaging a portion of said container to define therewith a receiving chamber for contaminated water from the aquarium tank, a second removable partition wall confrontingly engaging another portion of said container to define therewith an air lift chamber, a removable perforated platform integral with said second removable partition wall and confrontingly situated on a base wall of the container to define therewith a clear water chamber in flow communication with said air lift chamber, the portion of the container not included in said aforementioned three chambers defining a filtration chamber in flow communication between said receiving chamber and said clear water chamber, and cover means securely retaining the removable walls and platform secured together in a unitary assembly to prevent leakage between the three chambers, whereby the disassembled filter can be easily cleaned due to the absence of any integrally pre-formed chambers.

11. An aquarium assembly as in claim 10, wherein said container is substantially cylindrical, and said first and second removable partition walls are arcuate in shape.

12. An aquarium assembly as in claim 10, and comprising means defining a passageway entering said clear water chamber for receiving an air-line tubing for supply of air to the clear water chamber, and retention means for retaining said air-line tubing in said passageway, whereby said tubing is prevented from sliding up the air lift chamber and acts as a handle for removing and lowering the filter assembly.

13. An aquarium filter assembly for an aquarium tank, comprising a container, a removable grill wall confrontingly engaging a portion of said container to define therewith a receiving chamber for contaminated water from the aquarium tank, means providing replacement of said removable grill wall for permitting changing of the grill size of the grill wall to accommodate fish size, an air lift chamber defined in conjunction with another part of the container, a filtration chamber in said container in flow communication with said receiving chamber for filtering the contaminated water, a clear water chamber in flow communication between said filtration chamber and said air lift chamber, and cover means securely retaining the grill member in assembled condition with said container.

14. An aquarium filter assembly as in claim 13, wherein said container is substantially cylindrical and includes an inwardly directed concave forward wall, and said grill member is convexly shaped to confrontingly mate with said forward wall and proximates the peripheral wall of the container.

* * * * *